(No Model.)

O. S. PRESBREY & A. NALL.
CULTIVATOR.

No. 312,382. Patented Feb. 17, 1885.

WITNESSES:
C. Neveux
C. Sedgwick

INVENTOR:
O. S. Presbrey
A. Nall
BY Munn & Co.
ATTORNEYS.

United States Patent Office.

OLIVER S. PRESBREY AND AARON NALL, OF MORIAH, NEW YORK.

CULTIVATOR.

SPECIFICATION forming part of Letters Patent No. 312,382, dated February 17, 1885.

Application filed June 10, 1884. (No model.)

*To all whom it may concern:*

Be it known that we, OLIVER S. PRESBREY and AARON NALL, of Moriah, Essex county, New York, have invented a new and useful Improvement in Cultivators, of which the following is a full, clear, and exact description.

This invention pertains to improvements in cultivators; and it consists of the detailed construction and combination of parts, substantially as hereinafter fully set forth, and pointed out in the claim.

Reference is to be had to the accompanying drawings, forming part of this specification, in which similar letters of reference indicate corresponding parts in all the figures.

Figure 1:
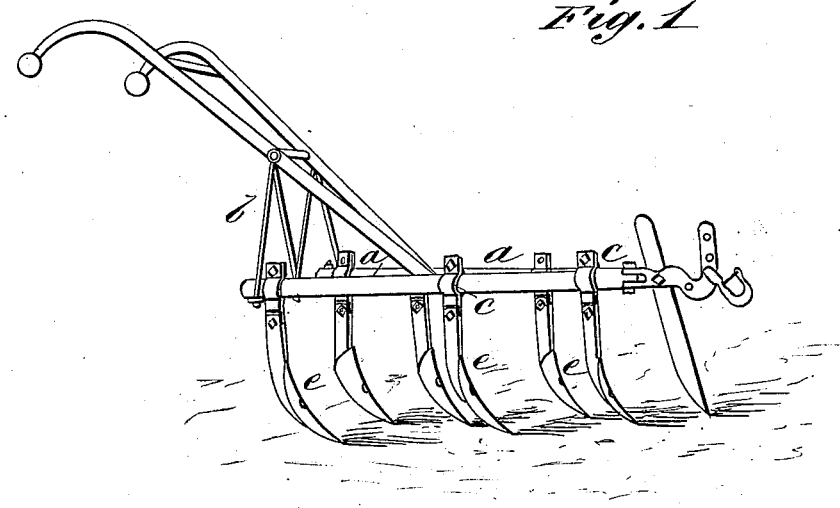
Figure 2:
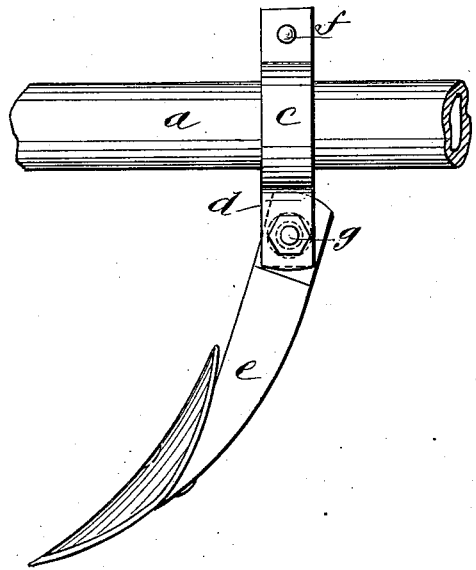
Figure 3:
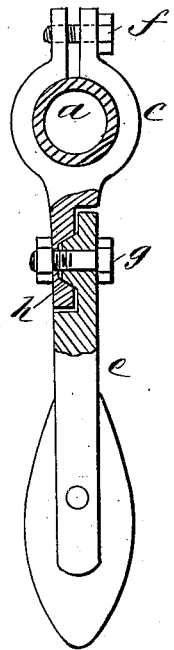

Figure 1 is a side perspective view of a cultivator of our improved construction. Fig. 2 is a side view, and Fig. 3 a back view, partly in section, of one tooth.

The frame of the cultivator consists of two rods or tubes, $a\ a$, connected at their forward ends and sustained a proper distance apart at the rear by braces $b$, that also support the handle. Upon the rods $a$ are clamps $c$, which are bands or collars with open flanged ends that receive a screw, $f$, whereby the clamps are tightened on the rods. The clamps are formed with lugs or flanges $d$, to which the teeth $e$ are attached by bolts $g$, and in order to hold the teeth firmly up to their work with one screw in each the flanges $d$ are formed with beveled recesses and the teeth with tapering lugs $h$, that are drawn tightly into the recesses by the nuts, so that there shall be friction enough to hold the teeth ordinarily; but the teeth may swing back when they strike a large stone or other obstruction. This saves the teeth from breakage. By loosening the clamps $c$ they can be turned on the frame to swing the teeth up sidewise, so that one or more teeth can thus be thrown out of action. The clamps can also be moved endwise of the rods for adjustment of the teeth to the work—as, for instance, several of them may be moved back into a group to form a shovel-plow.

The teeth may be attached to the frame direct by the friction connection instead of using a clamp. We do not limit ourselves in that respect.

Having thus described our invention, we claim as new and desire to secure by Letters Patent—

In a cultivator, the combination, with the cylindric beam $a$, of the clamping band or collar $c$, with its flanged ends connected or screwed together, the lower side of said band or collar having a flange, $d$, with one side stepped and recessed to receive a beveled lug, $h$, of the standard $e$, said flange $d$ and standard being connected together by a pivot-bolt, $g$, substantially as shown and described.

OLIVER S. PRESBREY.
AARON NALL.

Witnesses:
WILLIAM H. CARR,
MARK E. CARR.